United States Patent [19]
Hickman

[11] Patent Number: 5,322,660
[45] Date of Patent: Jun. 21, 1994

[54] METHOD OF LAMINATING GLASS

[75] Inventor: James A. A. Hickman, Edinburgh, United Kingdom

[73] Assignee: Miller Construction Limited, Edinburgh, United Kingdom

[21] Appl. No.: 940,855

[22] PCT Filed: Apr. 23, 1991

[86] PCT No.: PCT/GB91/00643
§ 371 Date: Nov. 25, 1992
§ 102(e) Date: Nov. 25, 1992

[87] PCT Pub. No.: WO91/16198
PCT Pub. Date: Oct. 31, 1991

[30] Foreign Application Priority Data
Apr. 23, 1990 [GB] United Kingdom ............... 9009066

[51] Int. Cl.⁵ .............................................. B32B 17/06
[52] U.S. Cl. .................................... 264/261; 156/104; 156/102
[58] Field of Search ................. 156/99, 103, 104, 107, 156/244, 22, 102, 103, 105; 252/601; 428/921; 264/261, 316

[56] References Cited

U.S. PATENT DOCUMENTS 3,754,510  8/1973  Marondel et al. ............... 102/101
4,234,533  11/1980  Langlands ........................ 156/107 X
4,828,784  5/1989  Hahn .................................. 264/316

FOREIGN PATENT DOCUMENTS 2148484  3/1973  France .

Primary Examiner—Michael W. Ball
Assistant Examiner—Francis J. Lorin
Attorney, Agent, or Firm—Davis Hoxie Faithfull & Hapgood

[57] ABSTRACT

A method of producing a fire-resistant glazing product comprising introducing a predetermined quantity of an epoxy based liquid resin material at an elevated temperature into a cavity defined between spaced apart glass panes so that at least one pane bows outwardly, moving the panes back into a substantially parallel, closely spaced apart relationship to cause the introduced resin material to fill the cavity and allowing the resin material to cure.

14 Claims, 1 Drawing Sheet

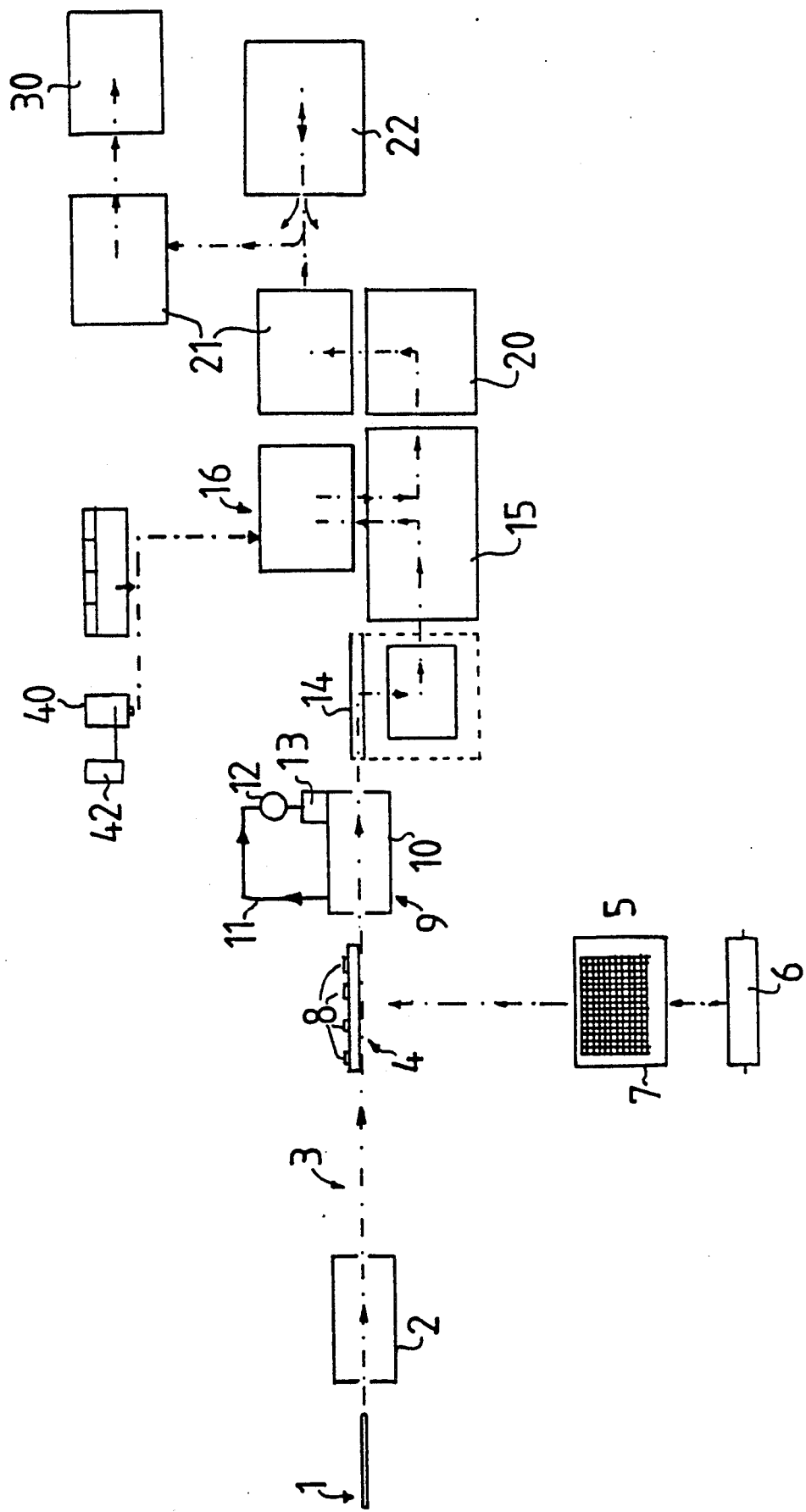

METHOD OF LAMINATING GLASS

TECHNICAL FIELD

This invention relates to a method of producing a fire-resistant glazing product, the method being of the kind comprising introducing a predetermined quantity of an epoxy based liquid resin material into a cavity defined between spaced apart glass panes of a glazing assembly so that at least one of the glass panes bows outwardly, causing the glass panes to be moved relatively towards each other into a substantially parallel closely spaced apart relationship so that the introduced liquid resin material fills the cavity and curing the resin material with the glass panes in said substantially parallel closely spaced apart relationship.

BACKGROUND ART

A known method of the kind referred to is described in GB-A-2032844. In particular reference is made to a liquid which sets to form a polymer being introduced into the cavity and the specification refers to suitable polymers being polyesters, vinyl polymers and epoxy resins. Although the use of epoxy resins is not discussed in detail in GB-A-2032844, reference is made to the addition of diluents to lower the viscosity of the polymer liquid in order to lower the viscosity of the liquid so that it can be suitably poured into the cavity.

Another known method similar to the kind referred to, but not disclosing the use of epoxy resins as a resin material, is described in WO 88/06096. In this known specification, methacrylate resin is referred to as the preferred resin material and fire-resistance is obtained by incorporating a wire mesh in the resin interlayer to retain the interlayer in a coherent form when it commences to melt when subjected to intense heat. In the preferred method of manufacture, the glazing assembly is tilted at an angle to the horizontal and the predetermined quantity of methacrylate resin is poured into the cavity between the spaced apart upper edges of the inclined glass panes. The inclined glazing assembly with the introduced methacrylate resin is then lowered to a substantially horizontal position and the weight of the upper glass panel squeezes the resin material between the glass panels so as to completely fill the cavity between the glass panels. A similar process, without any reference to the introduction of a wire mesh, is also disclosed in GB-B-2155856 although in this latter specification no claims are made to the process enabling the production of glazing products having improved fire-resistance.

It has now been found that epoxy based resin materials provide a far better fire resistance when incorporated as an interlayer between spaced apart glass sheets than an interlayer of methacrylate resin material. However epoxy based liquid resin materials are generally too viscous at normal operating temperatures of up to 25° C. to spread naturally between large area glass panes, e.g. each typically up to a size of 3000 mm by 1630 mm, which are intended to be spaced apart only a small distance, e.g. typically no more than 2 mm, in the finished glazing product. However if a higher degree of fire resistance is required, the interlayer thickness can be increased up to approximately 12 mm or so for an unwired glazing product.

It is of course known to add diluents to epoxy based liquid resin materials to reduce their viscosity. However the addition of too much diluent reduces the fire-resistance of the resin material. Moreover, if the viscosity of the liquid resin material is too low or too high, air bubbles tend to become trapped between the glass panes. This is especially apparent when a wire mesh is additionally embedded in the resin material between the spaced apart glass panes.

It is an object of the present invention to provide a method of manufacturing a fire-resistant laminated glass by introducing between spaced apart glass panes an epoxy based liquid resin material having a suitable viscosity to enable it to flow and spread between the glass panes.

DISCLOSURE OF THE INVENTION

According to the present invention a method of the kind referred to of producing a fire-resistant laminated glazing product, is characterised in that said epoxy based liquid resin material is introduced into the cavity at an elevated temperature and in that force is applied to assist spreading of the introduced liquid resin material within the cavity as the glass panes move together into their substantially parallel closely spaced apart relationship.

The effect of heating the epoxy based resin material to an elevated temperature prior to introducing it into the cavity between the glass panes is to reduce its viscosity without adversely affecting the fire-resistance of the cured resin material in the finished glazing product.

The applied force is preferably a pressing force which presses the glass panes towards each other from their bowed condition to their substantially parallel closely spaced apart relationship thereby assisting the spread of the liquid resin material between the glass panes. In addition, it is thought that the applied pressure assists in the adherence of the resin material to the facing glass panes—an important consideration in fire-resisting laminated glass products which are conventionally known to delaminate when subjected to intense heat. Prior to, or as an alternative to, the application of a pressing force, a suction force may be applied to the cavity to assist the spread of the introduced liquid resin material within the cavity.

Preferably the epoxy based liquid resin material is heated to such a temperature that its viscosity when introduced into the cavity between the glass panes is less than 1000 cSt, e.g. from 200 to 500 cSt. The elevated temperature that the epoxy based resin material should be heated to will depend on the composition of the resin material but typically will be in excess of 50° C., e.g. 60° C., but below 90° C. since too high a temperature reduces the working life of the resin material and involves additional energy costs.

Preferably the glazing assembly is pre-heated prior to the introduction of the liquid resin material. Ideally the glazing assembly is heated to a temperature such that the glass panes are at a temperature substantially the same as the said elevated temperature when the liquid resin is introduced into the cavity.

Preferably the glass panes are pressed together by heated pressure-applying means. For example the pressure-applying means suitably comprise substantially flat upper and lower plates at least one of which is movable towards and away from the other in order to apply and release pressure, the plates being heated, e.g. electrically or by heated air, water or the like. During the application of pressure to the glass panes, the glazing assembly and introduced resin material may be supported on an intermediate panel itself supported on the lower plate. The intermediate panel is provided in the case where the lower plate is not tiltable to place the glazing assembly in an inclined position during introduction of the liquid resin material into the cavity. Instead the intermediate panel is itself tilted into the inclined position. Alternatively the laminate could be pressed by other means such as a roller press or the like.

Preferably the glass panes are cleaned and dried before being formed into the glazing assembly. Conveniently the glazing assembly is formed by adhering double-sided adhesive tape to the periphery of one face of one cleaned and dried glass pane and then positioning the other cleaned and dried glass pane in face to face confronting relationship with the one glass pane and adhering it to the other side of the adhesive tape around all sides of the glazing assembly except that side through which the liquid resin material is to be subsequently introduced.

Suitably a production line is provided for performing the various stages of the method of manufacture, the glass panes and/or glazing assembly typically being supported on or by roller means during movement to and from, and whilst in, various work stations. Suitably the two glass panes are moved in sequence vertically through a cleaning and drying station for subsequent delivery to an assembly station. At the assembly station the glazing assembly is formed, e.g. as previously described. Suitably the glass panes are retained in a generally vertical disposition at the assembly station although they may be slightly inclined, e.g. at about 7°, against an inclined support to increase their stability whilst at the assembly station. At the assembly station a wire reinforcing mesh may be incorporated between the glass panes. In this case, the wire mesh is conveniently placed in position against the first glass pane prior to positioning the second glass pane in closely spaced apart confronting relationship with the first glass pane. In this case the wire mesh is conveniently magnetically retained in position against the first glass pane whilst the second glass pane is positioned against the first glass pane. After formation of the glazing assembly at the assembly station, the glazing assembly is conveniently moved to a pre-heating station for heating the glazing assembly to an elevated temperature, e.g. about 80° C. The heated glazing assembly is then moved from a generally vertical disposition to a generally horizontal disposition before being moved to the resin-introducing station.

After the introduction of the heated epoxy based liquid resin material at the resin-introducing station and the subsequent pressing of the glass panes together, the glazing assembly with introduced resin material is heat cured. Conveniently the heat curing is performed in two heating stages with the assembly being allowed to cool between the two heating stages. Typically, for example, the assembly is initially heated in an oven to a first temperature, e.g. 80° C., for a first period of time, e.g. 1 hour, and, after cooling, is heated again in an oven to a second temperature, e.g. 150° C., for a second period of time, e.g. 3 hours. The second temperature may, however, be reduced, e.g. to 80° C., if the second period of time is increased, e.g. to 8 hours.

As a final stage of manufacture the edges of the product may be trimmed.

Although the glass panes are normally flat glass the method can be adapted to produce curved glazing products, e.g. architectural bends or the like, from curved glass panes laminated together for fire (and safety) resistance with or without wire mesh incorporated in the interlayer.

Multi-layered glazing products may be produced by repeating the process one or more times and substituting one or both of the "glass panes" with a previously produced glazing product each time that the process is repeated.

BRIEF DESCRIPTION OF DRAWING

An embodiment of the invention will now be described, by way of example with reference to the accompanying drawing the sole figure of which shows a schematic layout in plan of a production line for producing laminated fire- (and/or safety-) resistant glazing products with or without wire mesh incorporated in an interlayer.

BEST MODE FOR CARRYING OUT THE INVENTION

The drawing schematically illustrates the stages involved in producing a fire-resistant glazing product by a method according to the invention. Initially two similarly sized, e.g. 3000 mm by 1630 mm, float glass panels 1 (only one of which is shown in the drawing) are passed sequentially in vertical disposition through washing and drying apparatus 2. Downstream of the apparatus 2 there is a rest station 3 and an assembly station 4. The first glass panel 1 after passing through the apparatus 2 is moved through station 3 and into station 4. The second glass panel 1 stays at the rest station 3 until it is ready for processing at the assembly station 4.

When at the assembly station 4, the first glass panel 1 is supported in a stable position slightly inclined, e.g. at about 7° from the vertical. Double sided adhesive tape is then adhered to the outwardly facing face of the first glass panel 1 adjacent each of its four peripheral sides. The backing or covering material covering the outwardly facing adhesive surface of the applied adhesive tape is not removed at this stage. The second glass panel 1, may now be moved from the rest station 3 into the assembly station 4 where it is carefully positioned in confronting face to face relation with the first glass panel 1. When correctly positioned, the backing or covering material is removed from the portions of adhesive tape which are adhered along the top and two sides of the first glass panel and the two glass panels 1 are pressed together around their peripheries to form a glazing assembly. The glazing assembly so formed has the two glass panels adhered together along three of their four sides with a cavity provided therebetween. The facing glass panes are spaced apart, at least at their peripheries, by the thickness of the adhesive tape which is sandwiched between the glass panels 1. Typically the glass panes will be spaced apart no more than 2–3 mm, e.g. 1.2 mm, at their peripheries for wired glass products (although a greater spacing apart, typically up to 12 mm or so, can be provided if a clear or unwired glazing product is required). The adhesive tape will normally be liquid and air impermeable so as to provide an air-tight and liquid-tight seal around the periphery of the glazing assembly. Examples of suitable adhesive tape are disclosed in GB-B-2155856.

If it is desired to produce a wired glazing product, wire mesh 5 cut to the required size from a roll 6 and flattened on a table 7 is positioned against the first glass panel 1 after the adhesive tape has been positioned on the latter. Preferably magnets, schematically shown by reference numerals 8, are provided at the assembly station 4 to hold the wire mesh in position until the second glass pane 1 is positioned in facing relationship to the first glass pane 1 and is adhered thereto by the peripherally placed adhesive tape as previously described. If wire mesh is so positioned in the cavity, the peripheral cavity thickness should preferably not exceed 2 mm. The wire mesh 5 employed is suitably conventional chemically treated steel wire mesh having wide meshes, e.g. 12.5 mm by 12.5 mm, or other types of wire mesh, such as diamond shaped, all as described in WO 88/06096. Alternatively a coloured wire mesh of the type described in WO 90/03268 may be employed.

After formation of the glazing assembly in station 4, the glazing assembly is moved into a heating station 9. The heating station has a heat box 10 through which heated air is recirculated. The air is circulated through a conduit 11 via a pump 12 and is heated by infra red heating means 13 at the entry to the heat box 10. The air is heated to an elevated temperature, typically about 130° C., and the glazing assembly is retained in the heat box 10 for a sufficient period of time, typically 3 minutes, to heat the glass panels to a temperature of about 80° C.

From the heating station 9, the glazing assembly is passed into a hydraulically pivoted support 14 which is operative to swing the glazing product into a substantially horizontal disposition for subsequent movement onto a table 15 having rollers (not shown) for facilitating movement of the glazing assembly thereacross. From the table 15 the glazing assembly is moved into a resin-introducing station 16.

The station 16 comprises a press having upper and lower heated platens, the lower platen being movable vertically towards and away from the upper platen. A board, for example of plywood, is positioned on the lower press platen and the glazing assembly is moved so as to be supported by this board. With the upper and lower press platens spaced well apart, the board is lifted into, and supported in, an inclined position with the glazing assembly similarly supported in an inclined position. The side of the second glass panel 1 which was not adhered to the adhesive tape (i.e. originally along the bottom of the glazing assembly when the latter was in station 4) is now the top edge of the glazing assembly and the glass panes can be prised apart along this top edge to enable a funnel or the like to be inserted between the glass panes and to extend into the cavity therebetween. It is of course possible to use various means to raise the laminate to an inclined position. For instance the lower heated platen of the press could be hydraulically or otherwise adjustable but this would increase the cost of the press.

With the funnel so inserted into the cavity, a predetermined quantity of previously mixed and heated epoxy based liquid resin material is poured down the funnel and runs down into the lower part of the cavity. As soon as all the liquid resin material has been poured into the cavity, the funnel is removed, the backing material is removed from the adhesive tape along the top edge and the two glass panes are pressed together to seal the panes along the top edge apart from two air holes left at opposite ends of the top edge. The board and glazing assembly supported thereon are moved back into a horizontal position on the lower press platen. In this position the upper glass pane is bowed outwardly by the presence of the introduced liquid resin material.

The press is now actuated to raise the lower press platen so that the glazing assembly is pressed against the upper press platen. Suitably the pressure is applied in at least two stages. For example, a first pressing stage is at a reduced pressure, typically about 0.6 kPa, and aims to provide an initial flattening of the bowed upper glass pane so that the liquid resin material is squeezed between the glass panes and spreads within the cavity. An intermediate pressing stage then follows in which a pressure of about 3.0 kPa is applied. A final pressure is then applied of at least 10 kPa, e.g. about 12.0 kPa, to press the upper glass panel into a condition substantially parallel to the lower glass panel and to squeeze the liquid resin material so that it spreads over the entire cavity at a substantially uniform thickness. If the final or even intermediate pressure is applied initially the glass of the glazing assembly is liable to crack. By the time that the pressing occurs, the glass panes will have cooled from their previously heated temperature to a lower elevated temperature, e.g. 60° C. Ideally this will be approximately the temperature that the liquid resin material is introduced into the cavity. The liquid resin material is maintained at its elevated temperature throughout the pressing operation by the air- or electrically-heated upper and lower platens of the press. The maintenance of an elevated temperature is important since the viscosity of the liquid resin material increases with lower temperatures and to ensure adequate spread or flow of the resin material between the glass panes the elevated temperature of the resin material should be maintained. As soon as the resin material spreads to the air holes indicating that the cavity has been completely filled and any air bubbles have been removed, the air holes are sealed.

Another method of assisting the spread of liquid resin material in the cavity is to ensure that the cavity is airtight and then to apply suction, e.g. by means of a vacuum probe inserted into the cavity, to the cavity to extract the air from the cavity when the glass is in its horizontal position. As air is steadily evacuated from the cavity, the flowable liquid resin material is pulled or sucked across the horizontal interlayer cavity. This method also extracts any air bubbles accidentally encapsulated in the resin material. The laminate can be additionally pressed with the heated platens after the air evacuation if required. However the preferred method is to use the heated platens on the press as previously described to provide improved parallelism of the glass panes.

The glazing assembly with the uncured resin interlayer is then moved out of the station 16 back on to the table 15 and is then transferred to a lifting and lowering device 20. The device 20 adjusts the vertical height of the horizontally positioned glazing assembly to enable the latter to be moved into a selected rack of a wheeled transporter 21 having a plurality of racks at different heights. When the racks are suitably loaded the transporter 21 is moved into an oven 22 for heat curing of the resin material. Typically the resin curing is completed in two stages. For example the glazing assembly is suitably heated initially at 80° C. for 1 hour before being removed and allowed to cool. A final curing involves heating the glazing assembly in the oven 22 at a temperature of 150° C. for 3 hours. This two stage curing has been found to be effective in providing good heat or fire resistance in the finished glazing product.

After curing, the transporter 21 is removed from the oven 22 and the cured glazing product is moved to a trimming station 30 for edge trimming of the glazing product to remove the edge regions in which the adhesive tape is sandwiched between the glazing panes.

As previously mentioned the liquid resin material poured into the cavity between the glass panes is epoxy based to provide good fire resistance. Many different types of epoxy material may be used although all have too high a viscosity for practical purposes at 25° C. Suitably, however, the liquid resin material comprises an epoxy novolac which also at 25° C. is far too viscous to be poured into the cavity. In order to reduce the viscosity, the epoxy novolac is heated, e.g. initially to a temperature of 85° C. In the FIGURE a drum of epoxy novolac is represented schematically by reference numeral 40. An electric thermostat probe 42 is inserted in the drum 40 and thermostatically controls a drum heater cradle (not shown) to maintain the epoxy novolac at the desired elevated temperature. Certain additives or modifiers are then added to the heated epoxy novolac. In particular there will be added a curing agent such as, for example, a polysulphide, a polyimide, an aromatic amine a catalytic anhydride or dicandiamide. Other additives may include an adhesion promoter such as silane, a reactive diluent, a fire- or heat-resisting additive such as a phosphite, an additive to increase the density of char when heated, a u.v. absorber such as benzophenomes or triazoles and additives to slow the rate of resin curing. When all the additives are added to the heated epoxy resin, the resin material is degassed to remove any air bubbles. The resin material will typically be at a temperature of about 60° C. when ready to pour into the cavity although its working temperature will depend on the precise composition of the resin material. Ideally the pouring viscosity should be less than 1000 cSt, preferably less than 500 cSt, e.g. 435 cSt, as at any viscosity above these figures pouring is difficult. The preferred viscosity is from about 200 cSt to about 500 cSt. Typically the viscosity of such epoxy based resin material varies with temperature as follows:
At 50° C., viscosity is 1150 cSt
At 60° C., viscosity is 445 cSt
At 70° C., viscosity is 205 cSt.
A typical mixed resin material will have the following constituents (percentages by volume):

| Epoxy resin, e.g. epoxy novolac resin | 30–80% |
|---|---|
| Phosphite or phosphate, e.g diphenyl phosphite | 1–40% |
| Silane | 0.1–4% |
| "Grillonit RV 1812" (reactive diluent) | 1–20% |
| Amine | 5–12% |
| Benzophenomes | 1–4% |

("Grilonit RV 1812" is a trade name of EMS-GRILON (UK) Ltd)

It has been found that the use of an epoxy based resin material provides the finished glazing product with a great degree of fire or heat resistance. By reducing the viscosity of the epoxy based resin material by heating without undue dilution of the resin material, the heat resistance of the epoxy resin is not adversely affected and glazing products so manufactured are able to pass the ½-hour fire test of BS 476 Part 20/22. Indeed it is possible to increase the fire resistance to 1 hour or more. Additionally the laminate will suitably comply with safety requirements of BS 6206 Impact Test.

When a wire mesh is embedded in the resin interlayer, the cavity spacing should typically be no more than 3 mm, ideally no more than 2 mm. In this case the wire mesh is squeezed into a flattened condition between the facing glass panes. The wire mesh is completely embedded in the liquid resin material and occupies a "centred" position between outer "surface tension layers" of the liquid. These surface tension "layers", at the boundaries where the liquid resin material meets the glass panes, prevent the wire mesh from actually contacting the facing glass panes provided, of course, that the cavity thickness is not too small, e.g. less than 1 mm. At cavity thicknesses in excess of 2 to 3 mm it is difficult to obtain a flat wire mesh in the finished product as described in WO 88/06096 in an economic or industrially acceptable manner.

The invention is illustrated by the following example.

EXAMPLE

Wired glass was manufactured as previously described with reference to the FIGURE. Specifically, each float glass pane 1 measured 3000 mm by 1630 mm (thickness 2.6 mm), the double sided adhesive tape applied at station 4 had a thickness of about 1.2 mm and the wire mesh 5 was conventional chemically treated Georgian wire mesh of a size slightly less than 3000 mm by 2630 mm and being of the type produced by Pilkington Brothers PLC having a 12.5 mm by 12.5 mm square mesh with an individual wire diameter of about 0.46 mm.

The glazing assembly produced at station 4 was preheated at heating station 9 to a temperature of 80° C. and was then moved to the resin-introducing station 9 where it was supported in an inclined position in a heated press having platens at a temperature, for example, of about 60° C.

The epoxy based liquid resin material was then prepared by admixing the following constituents (percentages by volume):

| Epoxy novolac resin | 57% |
|---|---|
| Diphenyl phosphite | 20% |
| Silane | 1% |
| "Grilonit RV 1812" | 10% |
| Amine | 10% |
| Benzophenomes | 2% |

In particular the novolac resin was heated to an elevated temperature of about 85° C. to lower the resin viscosity before the other constituents were added. Mixing takes a few minutes in which time the temperature of the resin material decreases and its viscosity increases. The mixed resin material was then degassed.

A measured quantity of the heated, mixed resin material was then poured between the glass panes at the station 16. The pouring temperature of the resin material was about 60° C. with the pouring viscosity being about 445 cSt. The temperature should not be allowed to fall too much below 60° C. (preferably no less than 50° C.) since the viscosity would then be too great for effective bubble-free pouring.

The heated press was then actuated to press the bowed, pre-heated glazing assembly in three stages applying, successively, pressures of 0.6 kPa, 3.0 kPa and 12.0 kPa. After sealing the air holes in the glazing assembly and removing any air bubbles in the resin material, the glazing assembly was cured at an elevated temperature in two stages. In the first curing stage the glazing assembly was heated at 80° C. for 1 hour before being allowed to cool. In the second curing stage, the glazing assembly was heated to a temperature of 150° C. for a period of 3 hours prior to being removed from the curing oven.

Finally after cooling the cured glazing product was edge trimmed to remove the double sided adhesive tape sandwiched between the glass panes at their peripheries.

INDUSTRIAL APPLICABILITY

The invention finds application in the manufacture of fire-resistant glazing products.

I claim:

1. In a method of producing a fire resistant glazing product comprising introducing a predetermined quantity of an epoxy based liquid resin material containing a fire resistant filler into a space between two glass panes of a glazing assembly so that at least one of the glass panes bows outwardly from the other and curing the resin material, the improvement which comprises introducing the epoxy based resin material into the space between the glass panes at an elevated temperature and pressing the glass panes together to enhance spreading of the introduced resin material within the space between the panes as the panes move together into a substantially parallel, closely spaced relationship.

2. A method according to claim 1, characterised in that the viscosity of the epoxy based liquid resin material when introduced into said cavity is less than 1000 cSt.

3. A method according to claim 2, characterised in that the viscosity of the epoxy based liquid resin material when introduced into said cavity is between 200 and 500 cSt.

4. A method according to claim 1, characterised in that the said elevated temperature is at least 50° C.

5. A method according to claim 1, characterised in that said epoxy resin material, after introduction into said cavity, is maintained at a temperature in excess of 50° C. at least until the glass panes are moved into said substantially parallel closely spaced apart relationship.

6. A method according to claim 1, characterised in that the said applied force is applied by pressing the glass panes towards each other.

7. A method according to claim 6, characterised in that the pressing force is applied in at least two stages of increasing magnitude, the final pressure stage applying a pressure force of at least 10 kPa.

8. A method according to claim 6, characterised in that the pressing force is applied by heated pressing means.

9. A method according to claim 8, characterised in that the glazing assembly is pre-heated prior to introduction of the liquid resin material into said cavity.

10. A method according to claim 9, characterised in that the glazing assembly is heated to such a temperature that the glass panes are approximately at the said elevated temperature when the liquid resin material is introduced into the said cavity.

11. A method according to claim 1, characterised in that the glass panes are spaced no more than 3 mm apart and in that a wire mesh is located between the glass panes.

12. A method according to claim 1, characterised in that the resin material is heat cured in at least two heat curing stages.

13. A method according to claim 1, characterised in that said epoxy based liquid resin material comprises an epoxy novolac.

14. A method according to claim 1, characterised in that the liquid resin material contains the following constituents (all percentages by volume):

| | |
|---|---|
| epoxy resin | 30-80% |
| phosphite or phosphate | 1-40% |
| Adhesion promoter (silane) | 0.1-4% |
| Grilonit (reactive diluent) | 1-20% |
| Curing agent (Amine) | 5-12% |
| UV absorber (Benzophenones) | 1-4%. |

* * * * *